United States Patent [19]
Nemoto

[11] Patent Number: 4,870,820
[45] Date of Patent: Oct. 3, 1989

[54] HST (HYDRO-STATIC-TRANSMISSION) SYSTEM DRIVING SPEED CHANGING APPARATUS

[75] Inventor: Shusuke Nemoto, Yao, Japan

[73] Assignee: Kanzaki Kokyukoki Mfg. Co. Ltd., Japan

[21] Appl. No.: 179,630

[22] Filed: Apr. 8, 1988

[30] Foreign Application Priority Data

Apr. 15, 1987 [JP] Japan .............. 62-57686[U]

[51] Int. Cl.[4] .............................. F16D 39/00
[52] U.S. Cl. ...................... 60/487; 74/701; 180/307
[58] Field of Search .......... 60/485, 487, 489; 74/694, 701, 720; 180/307; 91/499

[56] References Cited

U.S. PATENT DOCUMENTS

| 1,481,385 | 1/1924 | Nilson et al. . | |
|---|---|---|---|
| 2,791,912 | 5/1957 | Bixby . | |
| 3,190,075 | 6/1965 | Ebert | 60/489 |
| 3,196,696 | 7/1965 | Ritter . | |
| 3,339,662 | 9/1967 | Hanson et al. . | |
| 3,385,058 | 5/1968 | Root et al. | 60/485 |
| 3,430,438 | 3/1969 | Weiss | 60/485 X |
| 3,494,225 | 2/1970 | Binder et al. . | |
| 3,687,212 | 8/1972 | Forster | 180/307 X |
| 3,944,010 | 3/1976 | Winter et al. | 180/306 X |
| 4,145,883 | 3/1979 | Forster | 60/490 X |
| 4,171,571 | 10/1979 | Gritter | 91/499 X |
| 4,207,804 | 6/1980 | Fukui | 180/307 X |
| 4,223,532 | 9/1980 | Shiber | 60/490 X |
| 4,281,942 | 8/1981 | Gaeckle et al. . | |
| 4,292,855 | 10/1981 | Murayama . | |
| 4,304,141 | 12/1981 | Tone et al. . | |
| 4,364,229 | 12/1982 | Shiber | 60/490 X |
| 4,449,424 | 5/1984 | Hauser . | |
| 4,513,834 | 4/1985 | Hayashi et al. . | |
| 4,627,237 | 12/1986 | Hutson . | |

FOREIGN PATENT DOCUMENTS

683372 3/1964 Canada .................. 60/444

Primary Examiner—Edward K. Look
Attorney, Agent, or Firm—Saidman, Sterne, Kessler & Goldstein

[57] ABSTRACT

An HST system driving speed changing apparatus, including a hydraulic motor, which constitutes the HST system driving speed changing apparatus wherein the transmission case of the apparatus is also used as the hydraulic motor case. This construction facilitates assembly of the apparatus and therefore allows a savings in manufacturing cost. Also disclosed is an HST system driving speed changing apparatus, which provides a separate hydraulic pump. The pump has a changeable mounting position at the side surfaces of the transmission case, whereby the pump shaft can correspond to whichever direction the crank shaft of the engine is disposed.

8 Claims, 10 Drawing Sheets

HST (HYDRO-STATIC-TRANSMISSION) SYSTEM DRIVING SPEED CHANGING APPARATUS

FIELD OF THE INVENTION

The present invention relates to arrangement of a hydraulic pump and a hydraulic motor at a HST system driving speed changing apparatus for driving axles of a working vehicle, such as a tractor.

DESCRIPTION OF THE PRIOR ART

The HST system driving speed changing apparatus integrally attached to a mission case M has hitherto been well known.

Such prior art is disclosed in, for example, the Japanese Utility Model Laid-Open Gazettes No. Sho 62-87253 and No. Sho 61-139821.

The former, in which the HST system driving speed changing apparatus and mission case are vertically disposed, requires in the vehicle body a large space for containing therein the HST system driving speed changing apparatus, and later mounts the HST system driving speed changing apparatus, whereby the vehicle is larger in weight and expensive to produce.

Since the axial direction of the pump and motor is perpendicular to that of the mission case, a pair of bevel gears are required to connect both the members, whereby the inconvenience has been created in that the number of parts increases and a crank shaft for an engine is limited to extending downwardly.

Also, the art in the latter disposes the axis of a motor shaft extends in parallel to that of the mission case so as not to require the bevel gear. In this case, however, the crank shaft for the engine is limited to extending horizontally and inconvenience is created in that the HST driving speed changing apparatus to be later mounted is not compact, and larger in weight and expensive to produce.

SUMMARY OF THE INVENTION

An object of the invention is to provide an HST system driving speed changing apparatus, when a hydraulic motor portion thereof is provided in the mission case, not only contains therein the hydraulic motor but also requires no case therefor so that the mission case serves also as the case for the motor, thereby being simple to assemble and inexpensive to produce.

Another object of the present invention is to provide an HST system driving speed changing apparatus which mounts a separate hydraulic pump on the side surface of the mission case in relation of being changeable of its mounting position, and makes pump shaft changeable with ease in any direction, so that whichever direction a crank shaft of the engine extends in, the apparatus can cope with the above.

These and other objects of the invention will become more apparent in the detailed description and examples which follow.

DESCRIPTION OF THE PREFERRED EMBODIMENT

An embodiment of the HST system driving speed changing apparatus of the invention will be described with reference to the drawings.

Figure 1:
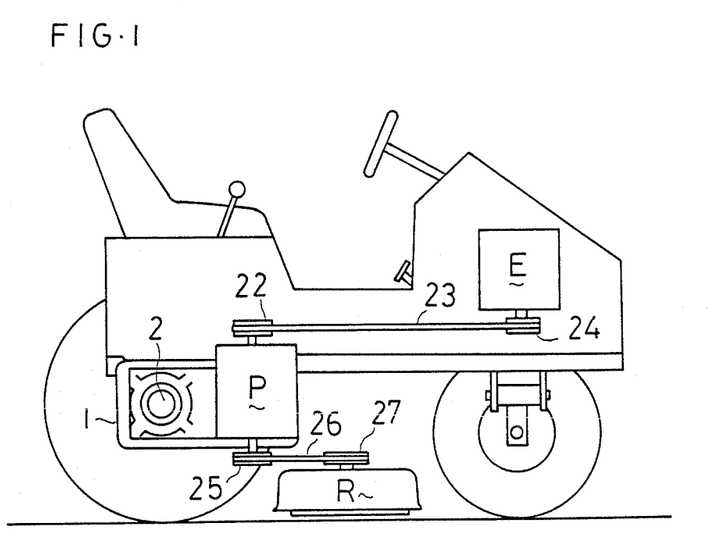
FIG. 1 is a side view of a tractor on which an HST type driving speed changing apparatus of the invention is mounted.

In FIG. 1, an engine E is disposed in a front bonnet of a tractor and a pulley 24 is attached to a crank shaft of the engine E. A pulley 22 is provided on a pump shaft 14 at the hydraulic pump P at the HST Hydro-Static-Transmission) type driving speed changing apparatus, a V-belt 23 being interposed between the pulleys 24 and 22.

The pump shaft 14 of the hydraulic pump P is extendable downwardly as a PTO shaft 28, in which a PTO pulley 25 is fixed. An input pulley 27 at a mower R is driven by the PTO pulley 25 through a V-belt 26.

Axles 2 project laterally from a mission or transmission case 1 and fixedly support at the utmost ends rear wheels respectively.

Next, a basic construction of the speed changing apparatus of the invention will be described in accordance with FIGS. 2, 3, 4 and 5.

Figure 2:
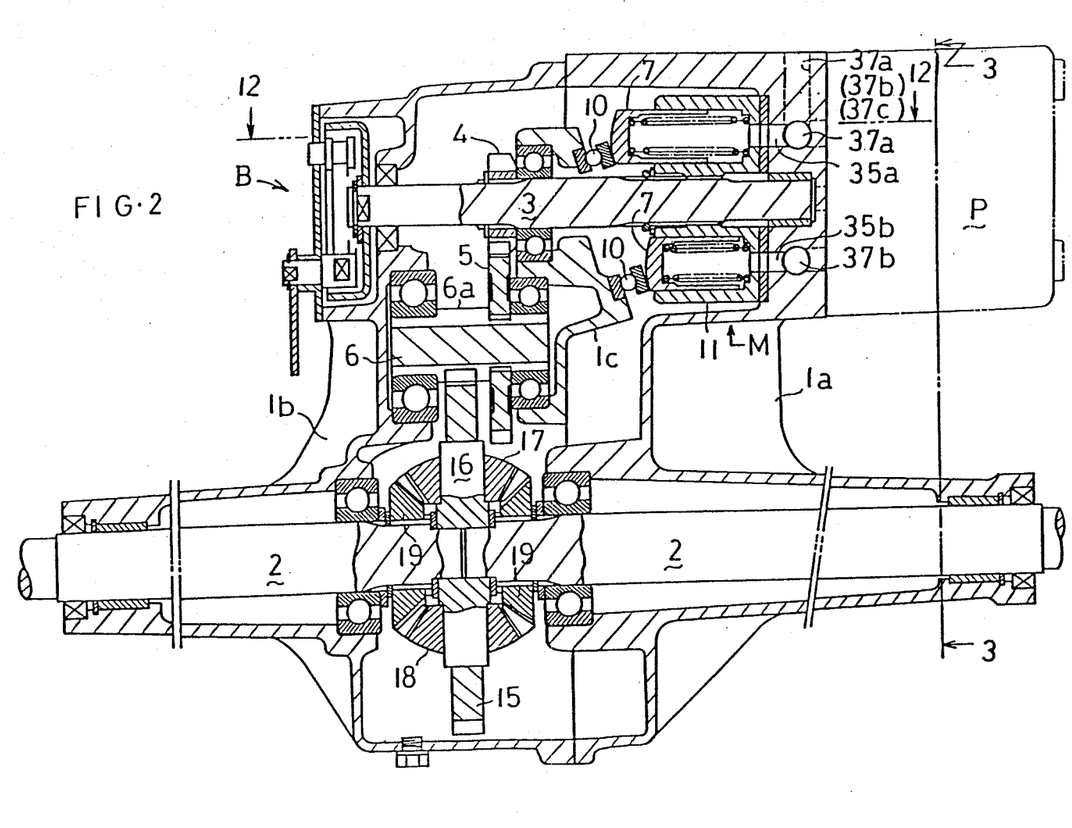
FIG. 2 is a sectional plan view of the HST system driving speed changing apparatus of the invention.

The mission case 1 is divided into comprises right or first and left or second half transmission case portions 1a and 1b which are sealed together, the first and second axles 2 being journalled thereto respectively.

The right-side half case 1a is used in part also as a case for the hydraulic motor M and contains the hydraulic motor M.

Figure 3:
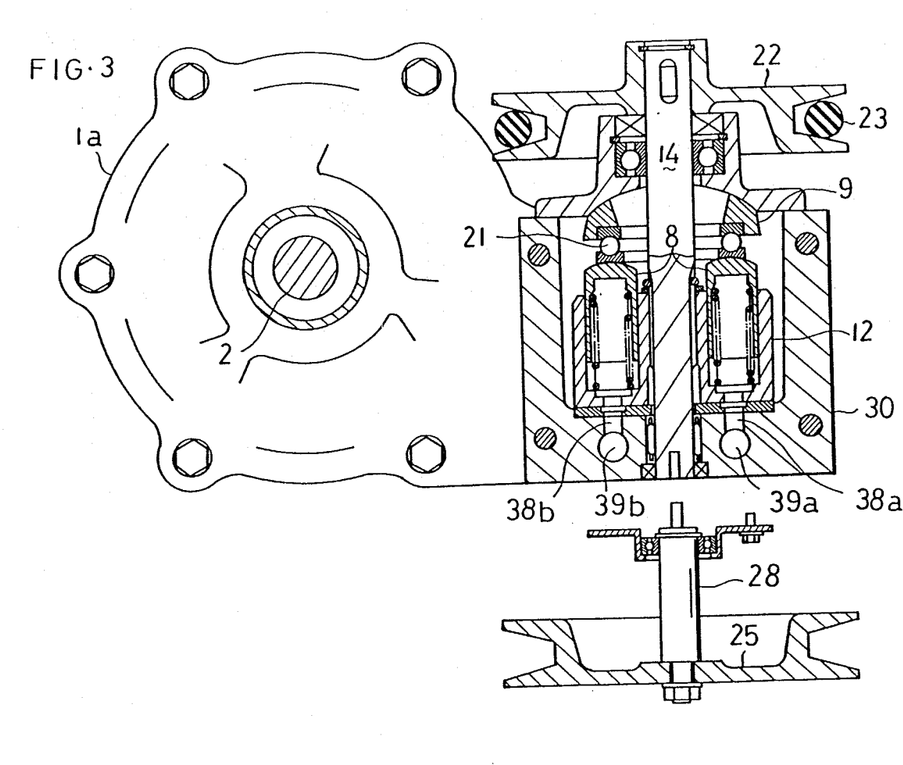
FIG. 3 is a sectional side view of the HST system driving speed changing apparatus taken along line 3—3 in FIG. 2, in which a hydraulic pump is attached to the side surface of the hydraulic motor.

The hydraulic pump P is constructed as shown in FIG. 3.

The pump shaft 14 is fixed to the pulley 22 driven by the V-belt 23 and rotates to rotatably drive a piston holder 12.

A plurality of pistons 8 are fitted into cylinder bores at the piston holder 12 respectively, and a speed change lever 34 changes a slant angle of a swash plate 9, so that the stroke of piston 8 varies to change a discharge amount and the discharge direction. In addition, a reference numeral 21 in FIG. 3 designates a thrust bearing.

The hydraulic motor M is constructed as shown in FIG. 2.

A plurality of pistons 7 are fitted into cylinder bores at a piston holder 11, pressure oil from the hydraulic pump P flowing between the pistons 7 and the piston holder 11 so as to rotate the piston holder 11.

A hydraulic motor shaft 3 is fixed to the center of the piston holder 11.

The hydraulic motor shaft 3 is journalled to a fixed base 1c for the swash plate mounted on the side surface of the right-side mission case 1a and projects into the left-side mission case 1b so that a gear of an output member 4 on the hydraulic motor shaft 3 drives a shaft 5 on an intermediate gear 6 constituting a driving power transmission system.

The hydraulic motor shaft 3 is journalled at one end to the inner wall surface of the case 1a fixing the piston holder 11 within the first case and at the other end to a bearing provided at the fixed swash plate base 1c.

At the fixed swash plate base 1c is provided a thrust bearing 10, against which each piston 7 abuts.

The intermediate shaft 6 supports at one end thereof to the fixed swash plate base 1c and is journalled at the other end to the left-side half case 1b.

A gear 6a teethed on the intermediate shaft 6 engages with a ring gear 15 at a diff gear unit, thereby rotating therethrough the right and left axles 2.

The portion constituted of the output member 4, gear 5, intermediate shaft 6 and gear 6a, is the driving power transmission system which is disposed in the left-side half case 1b.

The fixed swash plate base 1c is separate from the half cases 1a and 1b and mounted therebetween.

The diff or differential gear unit has a diff pinion shaft 16 fixed in an opening inside the ring gear 15. Diff or differential pinions 17 and 18 are rotatably fitted on the diff pinion shaft 16, which engage with side gears 19 spline-engaging with the axles 2 respectively.

The side gears 19 spline-engaging with the axles 2 are locked of axially movement by bearings and snap rings on the axles 2.

In addition, a reference letter B designates a drum brake of well-known internal expansion type and housed in a brake case formed at the left-side half case 1b, which is fixed as a parking brake on one end of the hydraulic motor shaft 3.

Next, explanation will be given on part of an extension of the pump shaft 14 for fixing the PTO pulley 25 in FIG. 3.

The PTO shaft 28 is fixedly insertable at its portion into the pump shaft 14.

Figure 4:
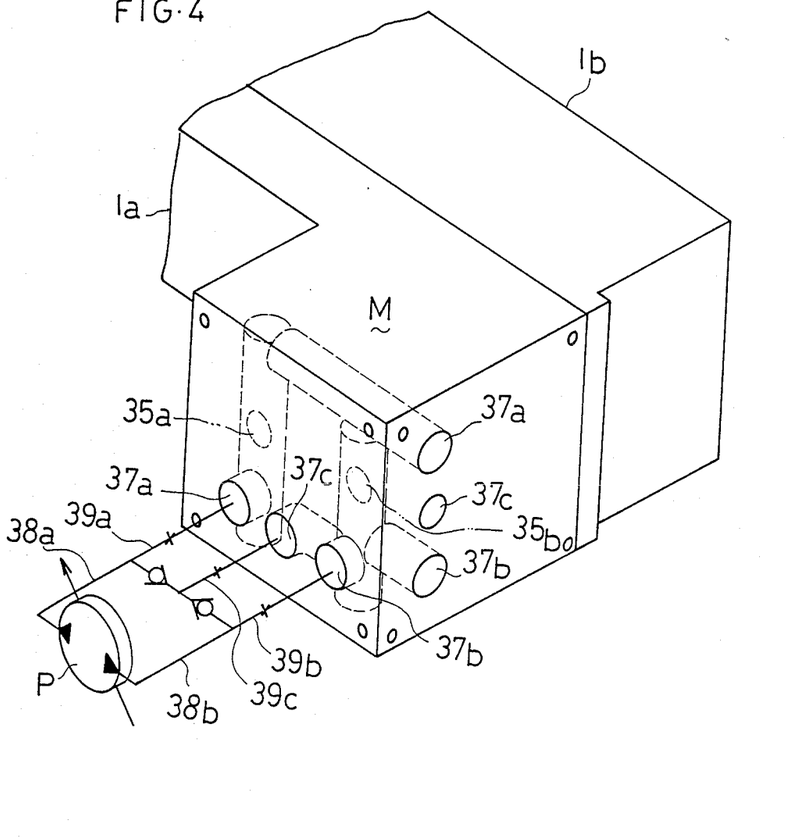
FIG. 4 is a perspective view of the embodiment of the invention showing a hydraulic circuit which attaches the hydraulic pump onto the side surface of the hydraulic motor.

As shown in FIG. 4, at a portion of the case for the hydraulic motor M in the right-side half case 1a are oil passages through one side wall of the right-side half case 1a for the hydraulic pump P.

In detail, oil passages 37a and 37b communicating with pressure oil ports 35a and 35b at the piston holder 11 for the hydraulic motor M are open at the right-side half case 1a and oil passages 39a and 39b communicating with pressure oil ports 38a and 38b at the piston holder 12 are open at the pump case 30 for the hydraulic pump P, so that the pump case 30 is attached only to the mission case 1 to connect the oil passages of operating oil, thereby enabling a closed circuit to be formed.

The oil passage 37c is open in the right-side half case 1a and communicates with a supply oil passage 39c between the hydraulic pump P and the hydraulic motor M, so that, when the operating oil in the closed circuit therebetween is short, a check valve is open to supply lubricating oil into the mission case 1.

Figure 6:
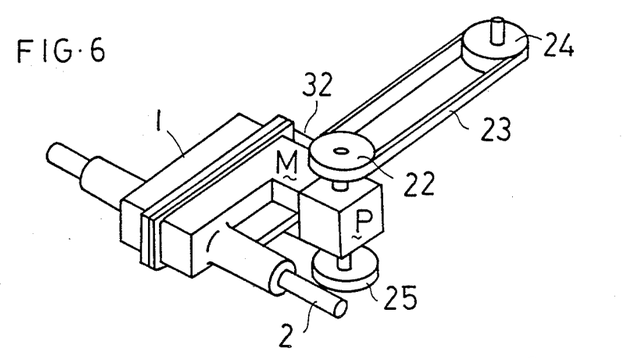
FIG. 6 is a perspective view of the embodiment of the invention, in which the hydraulic pump is attached to the lateral side of the hydraulic motor.

The embodiment shown in FIGS. 3 and 6 attaches the hydraulic pump P at the side surface of the hydraulic motor M as shown in FIG. 4.

Figure 5:
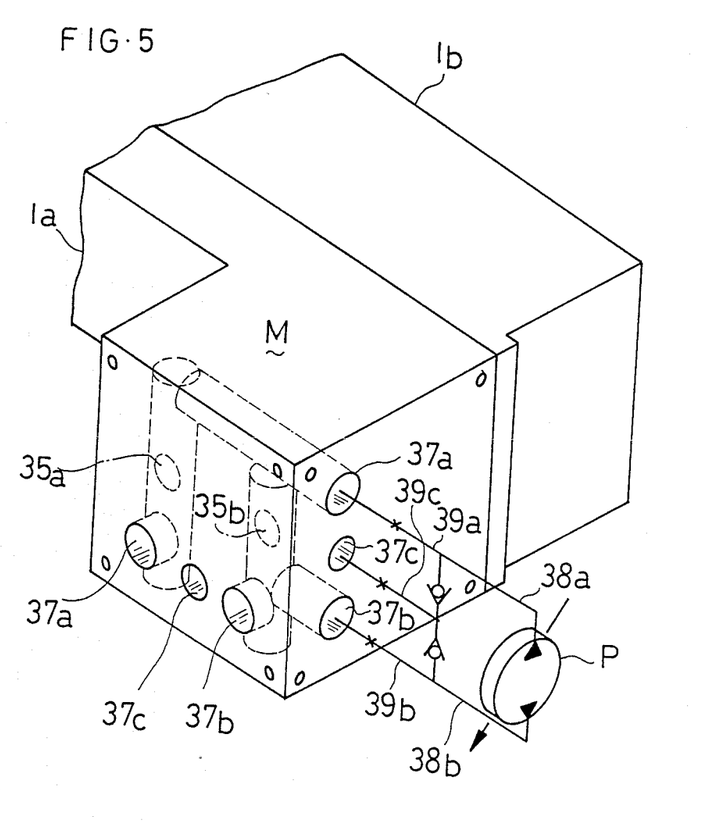
FIG. 5 is a perspective view of the embodiment of the invention, in which the hydraulic pump is mountable on the front surface of the hydraulic motor.

The oil passages 37a, 37b and 37c for the hydraulic pump P are provided at the right-side half case 1a and are, as shown in FIG. 5, open at the other side surface thereof.

Figure 7:
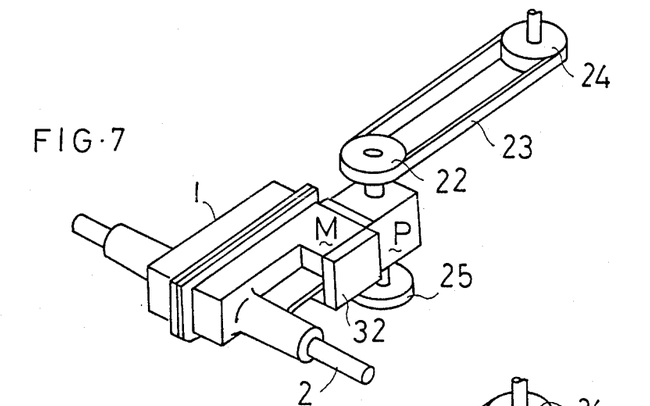
FIG. 7 is a perspective view of the same, in which the hydraulic pump is attached to the front side of the hydraulic motor.

In a case where the pump case 30 for the hydraulic pump P, when attached to the other side surface, is laid out at shown in a modified embodiment shown in FIG. 7.

In the FIG. 6 embodiment, the hydraulic pump P is attached to the front side of the hydraulic motor M and oil passage 37 at the other side surface is closed by a lid 32, the PTO pulley 25 being disposed below the pump P.

In the FIG. 7 embodiment, the hydraulic pump P is attached to the front side of the hydraulic motor M and the oil passage 37 at the one side surface is closed by the lid 32.

The lid 32 serves to close one or the other side surface not in use at the oil passage 37.

Also, the hydraulic pump P is mountable on the upper surface of half case 1a, in which the pressure oil is introduced into the mission case 1 from the oil passage 37 at the one side surface through an oil passage plate 33.

Figure 8:
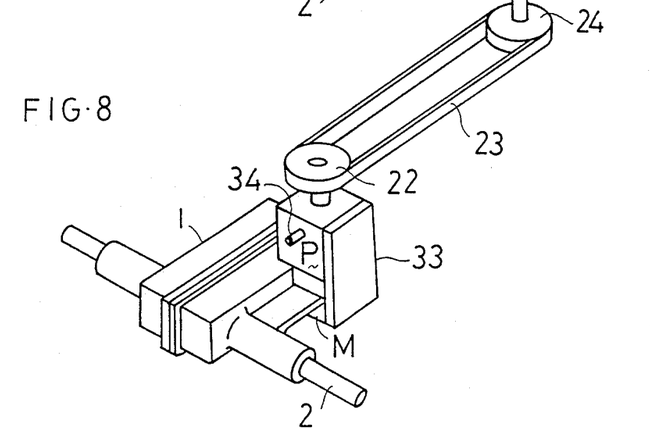
FIG. 8 is a perspective view of the same, in which the hydraulic pump is loaded on the hydraulic motor.
Figure 9:
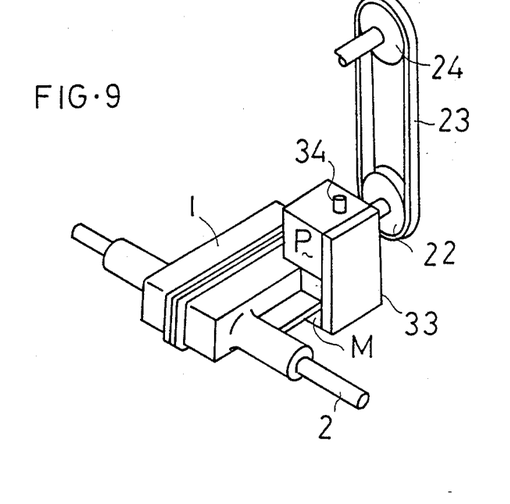
FIG. 9 is a perspective view of the same, in which the hydraulic pump is loaded on the hydraulic motor and a pump shaft projects forwardly, and a pump shaft projects forwardly.
Figure 10:
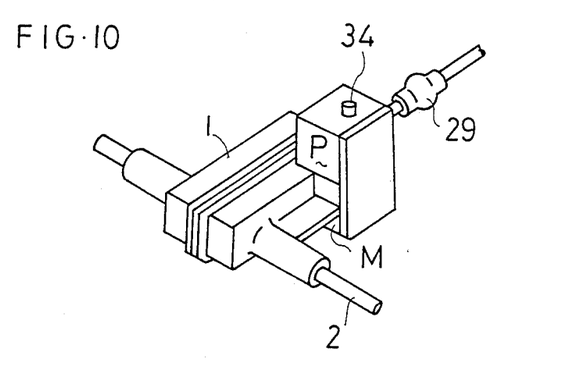
FIG. 10 is a perspective view of the same, in which a driving power is transmitted from an engine through a joint shaft.

The hydraulic pump P is placed above the hydraulic motor M as shown in FIGS. 8, 9 and 10.

In another modified embodiment in FIG. 8, since the hydraulic pump P is mounted on the hydraulic motor M in the reverse direction, a speed change lever 34 for rotating the swash plate 9 projects rearwardly.

In still another modified embodiment in FIG. 9, the hydraulic pump P is disposed to keep the pump shaft 14 horizontal, thereby projecting the pump shaft 14 forwardly of the case 1.

In this case, the engine E is provided with a horizontal crank shaft, which is constituted when disposed above the HST system driving speed changing apparatus.

In a further modified embodiment in FIG. 10, the pump shaft P similarly projects horizontally, but is different from the FIG. 9 embodiment in that the driving power is transmitted by a joint shaft.

Figure 11:
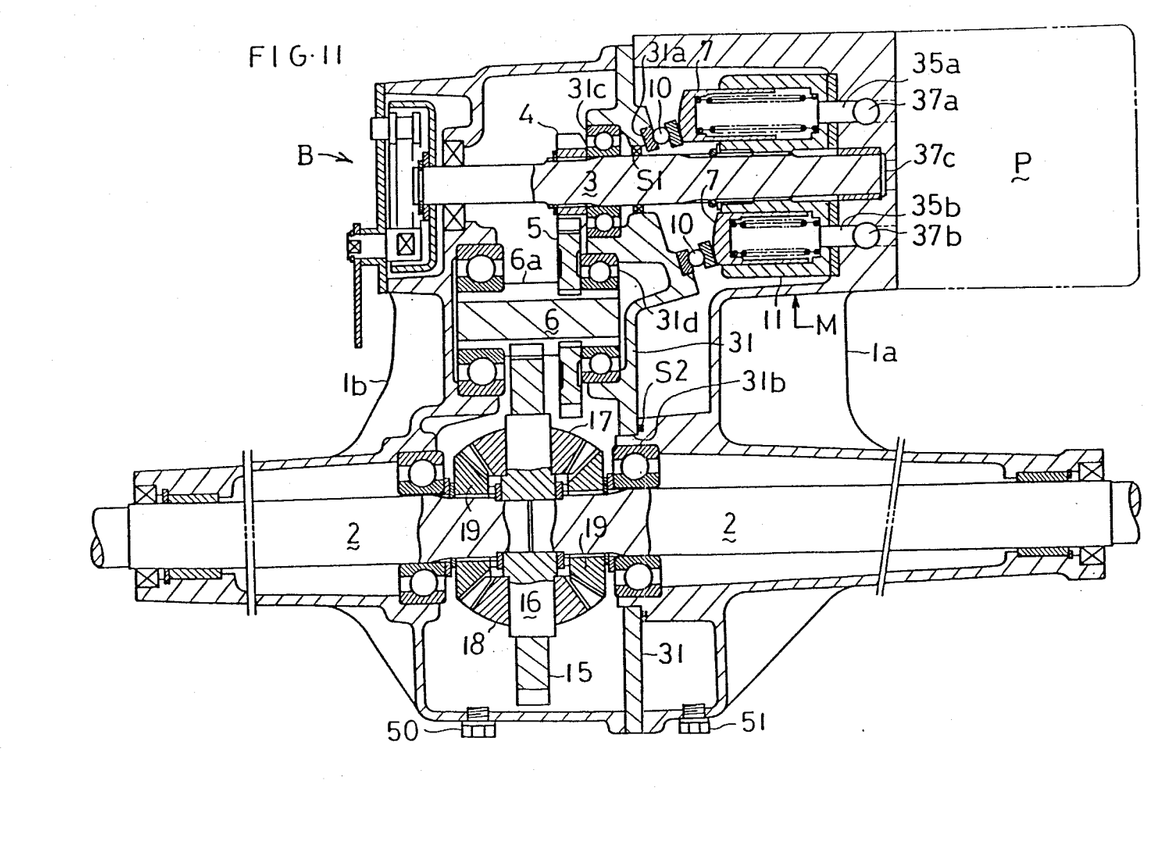
FIG. 11 is a sectional plan view of the HST system driving speed changing apparatus of the invention, in which a swash plate is formed in a separate wall 31.
Figure 12:
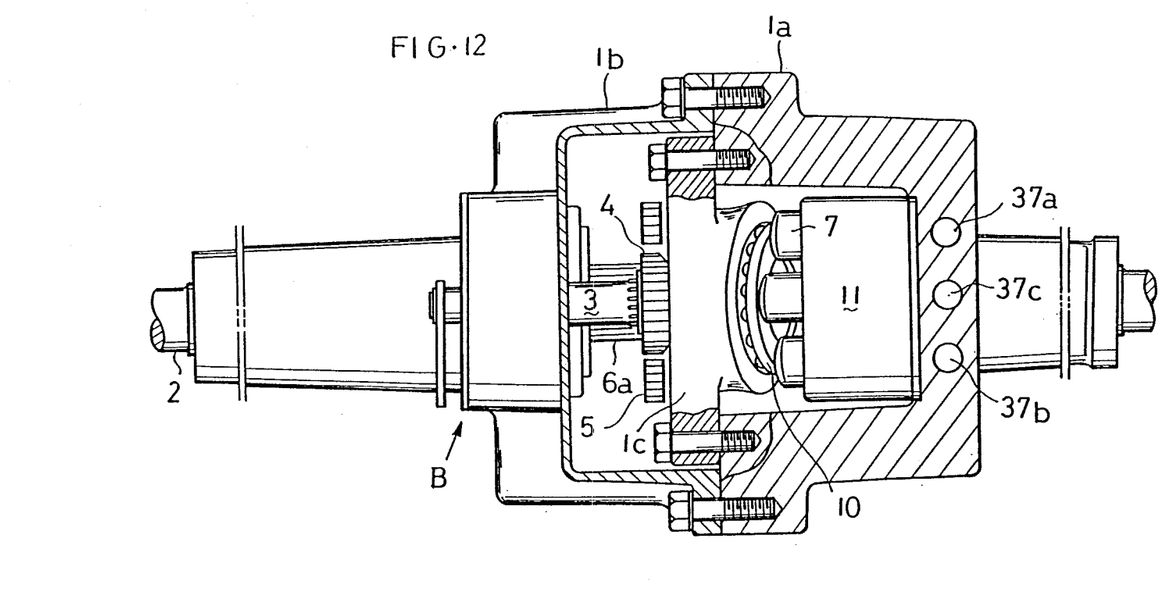
FIG. 12 is a sectional view taken along line 12—12 in FIG. 2.
Figure 13:
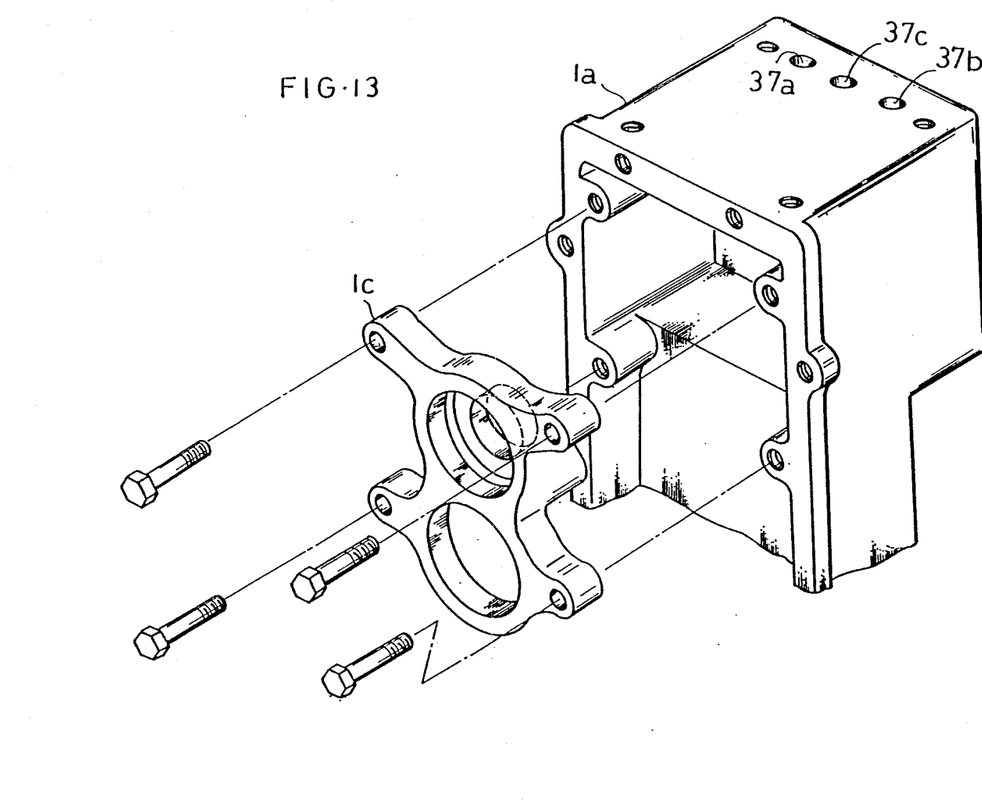
FIG. 13 is a perspective view of the fixed swash plate base 1c and one half of the case 1a, of Fig. 2.

Also, in still further modified embodiment shown in FIG. 11, the fixed swash plate base 1c shown in FIG. 2 is formed in a separate wall member 31 fixedly sandwiched between the opposite surfaces of the right-side mission case 1a and left-side one 1b.

In detail, at the left-side surface of the separate wall member 31 are open bearing bores 31c and 31d for receiving therein the bearing for the hydraulic motor shaft 3 and that for the intermediate shaft 6, a slanted bore 31a receiving therein the thrust bearing 10 being provided at the right-side of the wall member 31.

An oil seal S1 is fitted onto the hydraulic motor shaft 3 between the slanted bore 31a and the bearing bore 31c. A support cylinder is fitted into an opening 31b at the wall member 31 and the outer peripheral portion of the support cylinder is formed in an operating oil tank and an oil seal S2 is interposed at the opening 31b to be made perfectly oil-tight.

Accordingly, between the left-side half case 1b and the separate wall member 31 is constituted a lubricating oil tank containing therein the lubricating oil for the gears and diff gear unit at the driving power transmission system. A reference numeral 50 designates an oiling plug therefor.

Also, between the right-side half case 1a and the separate wall member 31 is constituted a tank for the operating oil, which sucks and supplies the operating oil, when short, in the closed circuit between the hydraulic pump P and the hydraulic motor M, in which a reference numeral 51 designates an oiling plug therefor.

The present invention constructed as above-mentioned has the following effects:

The case of hydraulic motor M also is used as the mission case 1, whereby the HST system driving speed changing apparatus can be small-sized and inexpensive to produce.

The fixed or mounted swash plate base 1c is fixed between the half cases 1a and 1b, whereby the half case 1a can extremely be restricted in a space for containing therein the hydraulic motor M so as to be compact.

Since the pump case 30 is fixed to the wall of mission case 1 to connect with the oil passage, there is no need that a pipe is interposed between the hydraulic pump P and the hydraulic motor M or the oil passage plate is interposed to send pressure oil, and the oil passages can be jointed between the pump case 30 and the wall of mission case 1, thereby enabling the HST system driving speed changing apparatus to be made compact.

Since the motor shaft 3 is journalled at one end thereof to the inner wall at the half case 1a and at an intermediate portion to the fixed swash plate base 1c, the hydraulic motor shaft 3 can be reduced in length to thereby enable the hydraulic motor M to be stably supported.

A bearing at the driving power transmission system is provided at the fixed swash plate base 1c disposed between the half cases 1a and 1b, highly machined portions gather at this bearing portion and other portions at the half cases 1a and 1b require no high machining, thereby enabling a short processing time and a low manufacturing cost to be obtained.

The fixed swash plate base 1c indispensable to construct the hydraulic motor M is utilized as the separate wall member 31 fixedly sandwiched between the right-side half case 1a and the left-side half case 1b, so that the lubricating oil tank for each gear at the power transmission system and the diff gear unit and the operating oil tank for the HST system driving speed changing apparatus are formed separately from each other, whereby bubbles or abrasion powder created by rotation of each gear at the driving power transmission system and the diff gear unit are not absorbed into the hydraulic pump P or the hydraulic motor M, inconvenience of poor operation of the piston caused by the bubbles is eliminated, and the durability of the hydraulic pump P or hydraulic motor M can be improved.

Also, the hydraulic pump P, which is solely constituted, is freely mountable on the wall surface of mission case 1, whereby whichever direction the crank shaft of the engine extends in, the pump shaft of the hydraulic pump P is changed only in the direction, thereby corresponding to the crank shaft.

Although the invention has been described with reference to several different embodiments, these embodiments are merely exemplary and not limiting of the invention which is defined solely by the appended claims.

What is claimed is:

1. An HST system driving speed changing apparatus comprising:
    a transmission case divided into first and second transmission case portions;
    a first axle being journaled to said first transmission case portion;
    a second axle being journaled to said second transmission case portion;
    a driving power transmission system disposed within said second transmission case portion;
    a differential gear unit disposed within said second transmission case portion;
    a piston holder disposed within said first transmission case portion;
    a plurality of pistons fitted within said piston holder;
    a swash plate base disposed between said first and second transmission case portions and supporting a thrust bearing, whereby said pistons abut against said thrust bearing;
    a hydraulic motor disposed within said transmission case, said hydraulic motor comprising a hydraulic motor shaft journaled at said first transmission case portion and fixing said piston holder;
    said hydraulic motor shaft disposed parallel to said first and second axles; and
    said hydraulic motor shaft extending from said first transmission case portion through said fixed swash plate base and into said second transmission case portion for connection with said driving power transmission system.

2. An HST system driving apparatus speed changing as set forth in claim 1, further comprising:
    a hydraulic pump case attached to said transmission case, said hydraulic pump case housing a hydraulic pump for supplying oil to said hydraulic motor;
    a first bored oil passage provided on said pump case;
    a second bored oil passage provided on said hydraulic motor;
    said first bored oil passage being connected to said second bored oil passage.

3. An HST system driving speed changing apparatus as set forth in claim 1, wherein said hydraulic motor shaft is journaled at one axial end thereof to an inner wall of said first transmission case portion and at said other axial end to said swash plate base.

4. An HST system driving speed change apparatus as set forth in claim 1, wherein said driving power transmission system further comprises:
    at least one shaft, said shaft being journaled at one end thereof to an inner wall of said first transmission case portion and at the other axial end to said swash plate base.

5. An HST system driving speed changing apparatus comprising:
    a transmission case divided into first and second transmisson case portions;
    a first axle being journaled to said first transmission case portion;
    a second axle being journaled to said second transmission case portion;
    a driving power transmission system disposed within said second transmission case portion;
    a differential gear unit disposed within said second transmission case portion;

a piston holder disposed within said first transmission case portion;

a plurality of pistons fitted within said piston holder;

a swash plate base fixedly sandwiched between said first and second transmission case portions and supporting a thrust bearing, whereby said pistons abut against said thrust bearing;

a hydraulic motor disposed within said transmission case, said hydraulic motor comprising a hydraulic motor shaft journaled at said first transmission case portion and fixing said piston holder;

said hydraulic motor shaft being disposed in parallel to said first and second axles; and said hydraulic motor shaft extending from said first transmission case portion through said fixed swash plate base and into said second transmission case portion for connection with said driving power transmission system.

6. An HST system driving apparatus speed changing as set forth in claim 13, further comprising:

a hydraulic pump case attached to said transmission case, said hydraulic pump case housing a hydraulic pump for supplying oil to said hydraulic motor;

a first bored oil passage provided on said pump case;

a second bored oil passage provided on said hydraulic motor;

said first bored oil passage being connected to said second bored oil passage.

7. An HST system driving speed changing apparatus as set forth in claim 5, wherein said hydraulic motor shaft is journaled at one axial end thereof to an inner wall of said first transmission case portion and at said other axial end to said swash plate base.

8. An HST system driving speed change apparatus as set forth in claim 5, wherein said driving power transmission system further comprises:

at least one shaft, said shaft being journaled at one end thereof to an inner wall of said first transmission case portion and at the other axial end to said swash plate base.

* * * * *

UNITED STATES PATENT AND TRADEMARK OFFICE
CERTIFICATE OF CORRECTION

PATENT NO. : 4,870,820

DATED : October 03, 1989

INVENTOR(S) : Shusuke Nemoto

It is certified that error appears in the above-identified patent and that said Letters Patent is hereby corrected as shown below:

On the face of the Official Letters Patent, under the heading Foreign Priority Data, insert —July 14, 1987 [JP] Japan ........62-175547 [P]
Aug. 18, 1987 [JP] Japan ........62-205934[P]—;
Column 7, line 21, delete "13" and insert —5— therefor.

Signed and Sealed this

Twenty-eighth Day of August, 1990

Attest:

HARRY F. MANBECK, JR.

*Attesting Officer*   *Commissioner of Patents and Trademarks*